(12) United States Patent
Escowitz et al.

(10) Patent No.: US 11,292,216 B2
(45) Date of Patent: *Apr. 5, 2022

(54) METHOD FOR THE DESIGN AND EFFICIENT MANUFACTURE OF FIBER-COMPOSITE PARTS

(71) Applicant: Arris Composites Inc., Berkeley, CA (US)

(72) Inventors: Ethan Escowitz, Berkeley, CA (US); J. Scott Perkins, Oakland, CA (US); Riley Reese, Oakland, CA (US); Erick Davidson, Piedmont, CA (US); Sean Hennessee, San Francisco, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/065,168

(22) Filed: Oct. 7, 2020

(65) Prior Publication Data

US 2021/0023800 A1  Jan. 28, 2021

Related U.S. Application Data

(63) Continuation of application No. 16/666,191, filed on Oct. 28, 2019, now Pat. No. 10,800,115.
(Continued)

(51) Int. Cl.
*B32B 41/00* (2006.01)
*B29C 70/54* (2006.01)
*B29C 70/30* (2006.01)

(52) U.S. Cl.
CPC .............. *B29C 70/54* (2013.01); *B29C 70/30* (2013.01)

(58) Field of Classification Search
CPC ....... B29C 70/54; B29C 70/30; B29C 70/202; B29C 70/46; Y02P 90/02; G06F 2111/04;
(Continued)

(56) References Cited

U.S. PATENT DOCUMENTS 10,800,115 B2    10/2020   Escowitz et al.
2003/0196743 A1  10/2003   Borbone et al.
(Continued)

FOREIGN PATENT DOCUMENTS

WO    2007/076357    7/2007

OTHER PUBLICATIONS

International Search Report issued in PCT Patent Application No. PCT/US2019/058386 dated Aug. 24, 2020 by Authorized Officer Wolfgang Sohrt.
(Continued)

*Primary Examiner* — Michael N Orlando
*Assistant Examiner* — Joshel Rivera
(74) *Attorney, Agent, or Firm* — Kaplan Breyer Schwarz, LLP

(57) ABSTRACT

A method for designing fiber-composite parts in which part performance and manufacturing efficiency can be traded-off against one another to provide an "optimized" design for a desired use case. In some embodiments, the method involves generating an idealized fiber map, wherein the orientation of fibers throughout the prospective part align with the anticipated load conditions throughout the part, and then modifying the idealized fiber map by various fabrication constraints to generate a process-compensated preform map.

19 Claims, 9 Drawing Sheets

Related U.S. Application Data

(60) Provisional application No. 62/751,040, filed on Oct. 26, 2018.

(58) Field of Classification Search
CPC ............. G06F 2113/22; G06F 2113/24; G06F 2113/26; G06F 2119/14; G06F 2119/18; G06F 30/23; G06F 30/17
USPC .................... 156/60, 64, 350, 351, 378, 379
See application file for complete search history.

(56) References Cited

U.S. PATENT DOCUMENTS

| | | |
|---|---|---|
| 2012/0323538 A1 | 12/2012 | Rassaian et al. |
| 2014/0076477 A1 | 3/2014 | Kismarton |
| 2015/0170022 A1 | 6/2015 | Malik et al. |
| 2017/0372480 A1 | 12/2017 | Anand et al. |
| 2020/0130297 A1 | 4/2020 | Escowitz et al. |

OTHER PUBLICATIONS

Non-Final Office Action received for U.S. Appl. No. 16/666,191, dated Dec. 30, 2019.
Notice of Allowance and Fees Due (PTOL-85) dated Jun. 12, 2020 for U.S. Appl. No. 16/666,191.
Authorized Officer Wellisch, J, International Search Report and Written Opinion dated Nov. 19, 2020 issued in PCT Patent Application No. PCT/US2020/021469.
Lee Jong Wook et al., Stress constraint topology optimization using layerwise theory for composite laminates, Jun. 29, 2019, Composite Structures, vol. 226.
Non-Final Rejection dated Jul. 20, 2021 for U.S. Appl. No. 16/811,537.

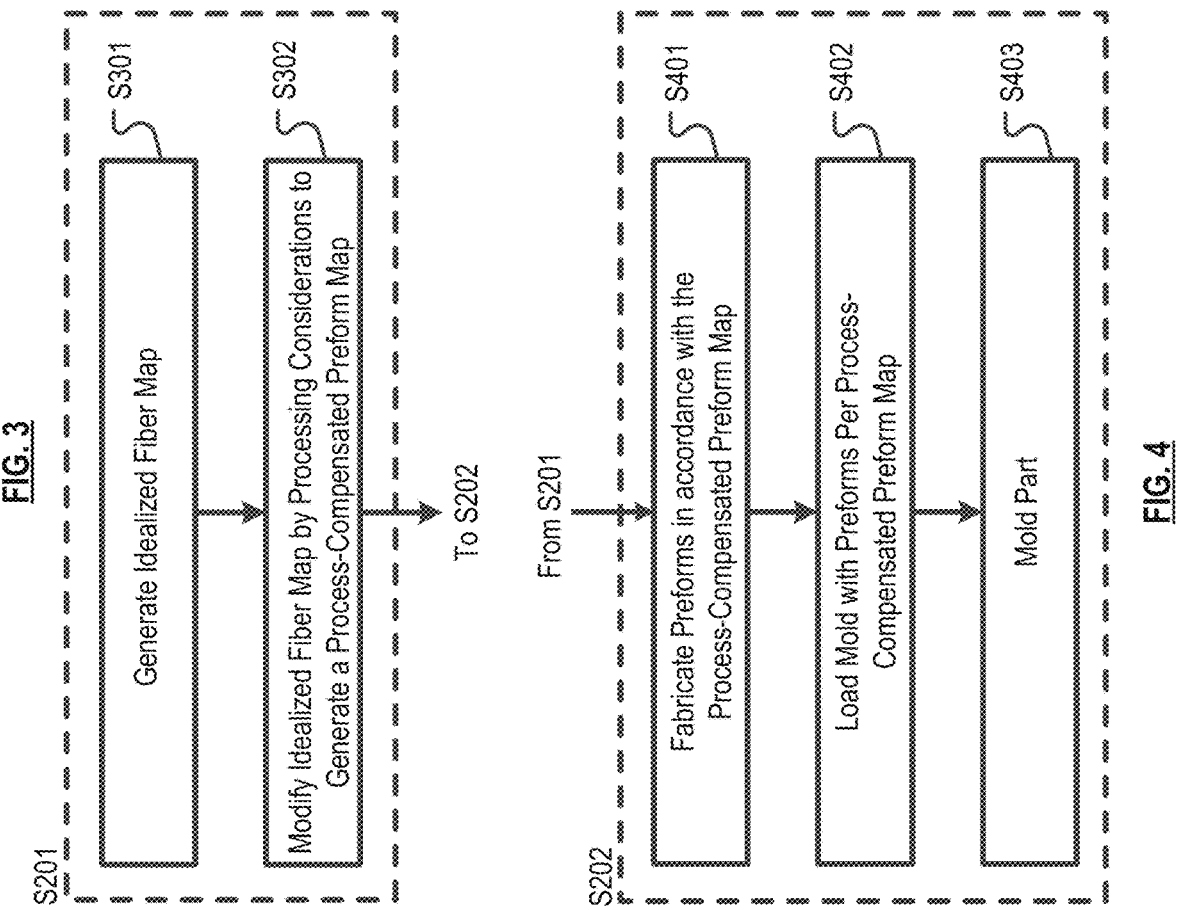

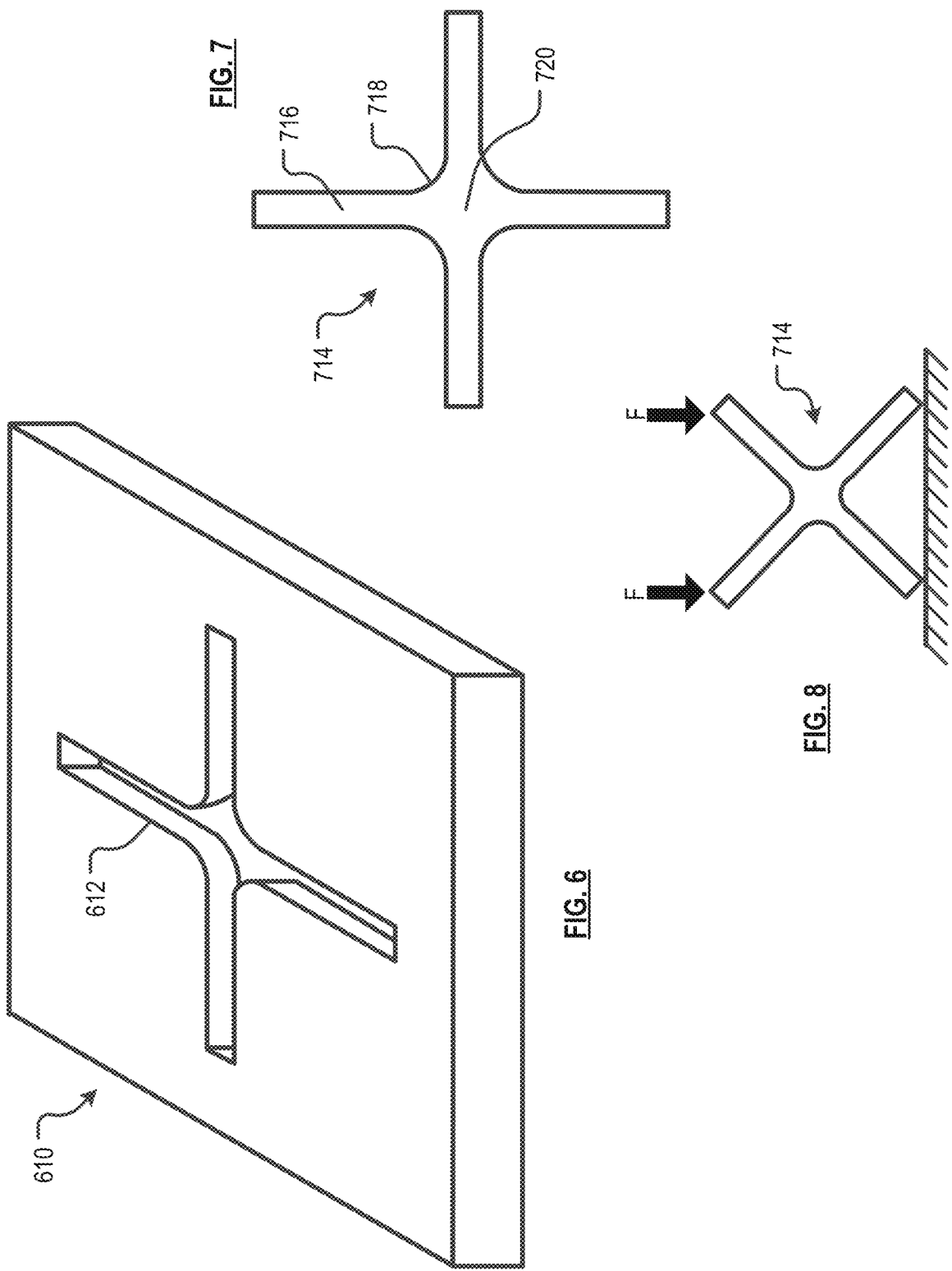

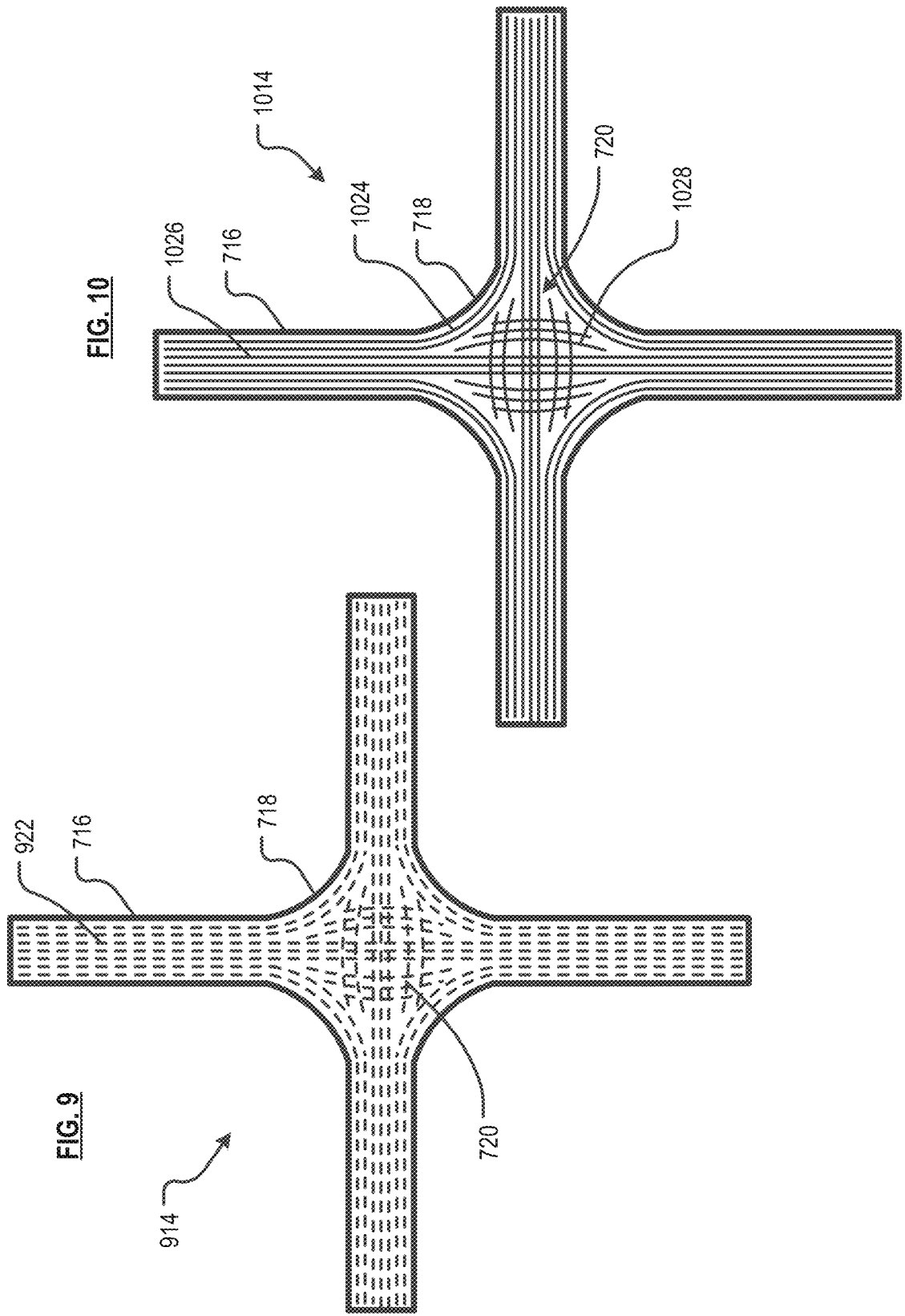

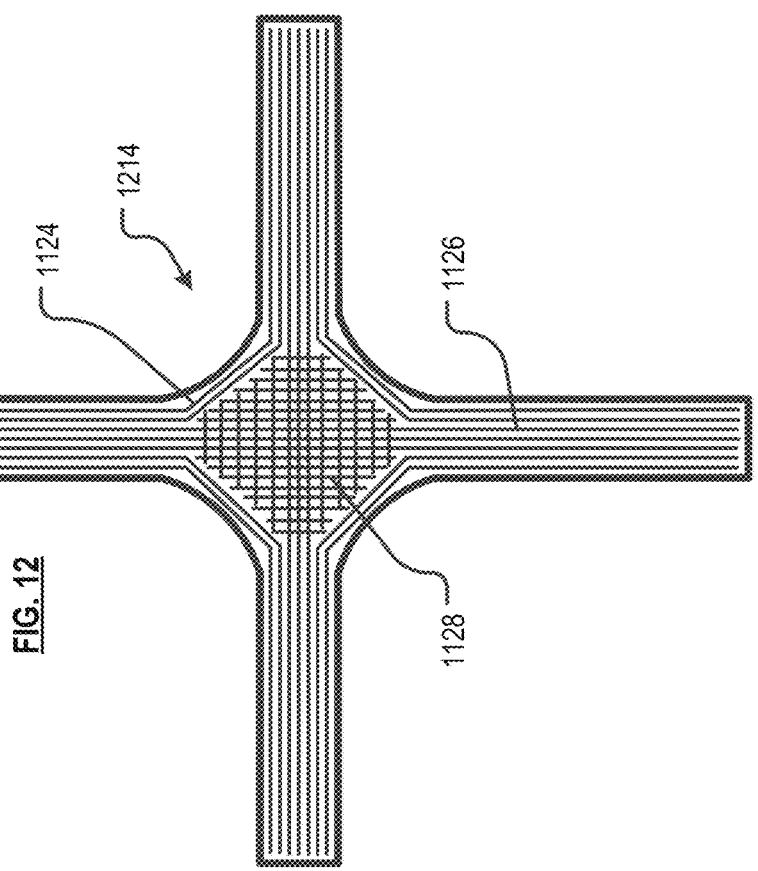

METHOD FOR THE DESIGN AND EFFICIENT MANUFACTURE OF FIBER-COMPOSITE PARTS

STATEMENT OF RELATED CASES

This application is a continuation of U.S. Ser. No. 16/666,191, filed Oct. 28, 2019, which claims the benefit of U.S. 62/751,040, filed Oct. 26, 2018, both of which are incorporated by reference herein.

FIELD OF THE INVENTION

The present invention relates to fiber-composite materials and parts made therefrom, and more particularly to methods for the design and efficient fabrication of such parts.

BACKGROUND

When designing parts made of orthotropic materials, such as fiber-reinforced polymers (FRP), it is desirable to optimize the fiber paths within the part. That is, an FRP part exhibits best achievable mechanical properties for a given part geometry when the fibers therein are aligned with the direction of principal stress everywhere throughout the part per the anticipated loading conditions. This is a consequence of the fact that the FRP material properties are most desirable in the direction of fibers.

Optimally arranging fibers during manufacturing is typically not possible, and certainly not practical, with prior-art methods. Specifically, since the fibers within the tapes or fabric typically used to make such parts are fixed in one (tape) or two (fabric) directions, any such directional "optimization" is usually limited to offsetting successive layers of the tape/fabric by standard offsets, such as +/−increments of 30°, 45°, etc.

But even if one could truly optimize the fiber layout as described above, the placement and alignment of fibers would take an excessive amount of time. For commercial-scale production of FRP parts, manufacturing efficiency is an important consideration. Consequently, directional optimization of fibers, even if it were possible, would necessarily be impractical, at least by any known techniques.

SUMMARY

The present invention provides a way to design and fabricate FRP parts in which part performance and manufacturing efficiency can be traded-off against one another to provide an "optimized" design for a desired use case.

Some embodiments in accordance with the present teachings comprise: (1) generating an idealized fiber map, wherein the orientation of fibers throughout the prospective part align with the anticipated load conditions throughout the part; and (2) modifying, as necessary, the idealized fiber map by various fabrication constraints to generate a "process-compensated preform map."

Consider that the idealized fiber map is likely to specify fiber directions and routing that includes curved paths, etc. When working with tape or fabric as in most prior-art fabrication processes, it would not even be possible to reproduce such curved fiber paths throughout a mold. The present inventors have disclosed processes for the fabricating fiber-composite parts in which "preforms" or assemblages of preforms ("preform charges") are used, rather than tape or fabric. The preforms are resin-impregnated bundles of fiber that are sized and shaped to fit the mold and can be aligned, with an unprecedented ability, along the anticipated directions of stress in the prospective part. The preforms are fabricated by sizing, (optionally) bending, and cutting segments of towpreg feed.

Preforms provide a greatly enhanced ability, relative to tape or fabric, to align with load conditions. However, even when using preforms, creating a smooth bend so as precisely follow stress contours within a part would be time consuming, and likely not possible without extremely complex equipment. Eliminating such smooth bends in favor of bends formed from one or two discrete/sharp angles (e.g., compare FIGS. 11A and 11B) increases manufacturability, and reduces fabrication time. Moreover, depending on part geometry, many different bend radii might be required to precisely conform to the idealized fiber map. Reducing process variability by decreasing the number of unique bend radii will also increase the production rate.

Consequently, by applying certain constraints related to the fabrication of preforms and/or the manufacturing process (compression molding in the illustrative embodiment), which implicate the issues raised above as well as other fabrication "realities," manufacturing efficiency can be increased. Thus, the idealized fiber map is altered, as necessary, to generate a process-compensated preform map wherein preforms having a specified size, shape, and orientation replace the ideal fiber directions of the idealized fiber map. The orientation and shape of the preforms are likely to deviate from the predicted stress contours and, hence, the optimum fiber paths. The greater the deviation from the ideal fiber paths, the greater the impact on part properties (e.g., mechanical strength, etc.).

Using the methods described herein, a manufacturer can trade-off/balance part performance and manufacturing efficiency. In some cases, a part simply needs to be "good enough;" that is, the part needs only to satisfy a minimum strength condition. In such cases, an "optimized" design might be one in which the prevailing fabrication constraints result in the most efficient (fastest) fabrication process that satisfies that the load condition. In other words, part properties are as good as, but no better, than required. In some other cases, such as for a part manufactured in relatively low volume, the weighting may be different, wherein there may be a greater emphasis on best possible part properties, and less of a concern for manufacturing efficiency.

By developing a plot, for example, that relates part performance to one or more fabrication constraints, a range of potentially acceptable part designs can be established. A design can then be selected from within the range, as a function of the relative weighting of performance versus efficiency.

It will be appreciated that a processing system (i.e., a computer, memory, I/O) is necessarily required to perform at least some steps of the methods described herein. This is a consequence of part geometry. In particular, intricate parts will generate complex stress contours, for which an analytical solution for the ideal and process-compensated fiber maps cannot be practically derived. Consequently, a numerical solution for such maps, as provided by a suitably programmed processor, is required.

In accordance with the present teachings, input that fully describes the geometry of a part being fabricated, and its anticipated loading conditions, is provided to a processing system. The processing system performs a finite element analysis (FEA) on the part geometry to calculate the stress under load. This results in a three-dimensional principal stress contour map that pervades the entire interior of the component. By considering the orthotropic material properties at hand, the processing system then calculates an ideal preform map from the principal stress contour map, such as by using an technique that determines "low-cost" routing.

If the component is not subject to manufacturing efficiency considerations (e.g., parts produced in small quantities, etc.), the processing system will output the idealized fiber map to the user or otherwise store the results. Otherwise, the processing system will prompt the user for fabrication constraints, such as those pertaining to preforms and those pertaining to the manufacturing process, such as compression molding, being used to manufacture the part.

The aforementioned constraints are applied to the idealized fiber map. In some embodiments, the application of these constraints alters the fiber paths in the map from a more nearly ideal state (shape, etc.) that is impractical for high-volume manufacturing, to a state that requires fewer process operations. This results in a reduction in the time required to produce the require fiber bundles—preforms—, with the part still meeting performance requirements. Based on application of the method, by altering the weighting of the various constraints, a design can be developed that maximizes manufacturing efficiency at the cost of part performance, or a design can be developed that maximizes part performance at the cost of manufacturing efficiency. Or designs can be established anywhere in between those extremes. In this sense, embodiments of the invention are capable of "balancing" the tradeoff between best part performance and best manufacturing efficiency, as is most appropriate for a particular application. In this sense, the methods described herein enable an "optimized" design of a fiber-composite part.

In some embodiments, the invention provides a method for designing a fiber-composite part, wherein the method comprises:

defining a geometry of the part and forces to which the part will be subjected;

determining stress contours of the part based on the geometry and the forces;

generating an idealized fiber map from the stress contours, wherein a direction of fibers in the idealized fiber map aligns with the stress contours of the part;

defining a plurality of constraints applicable to fabrication of the part; and generating a first process-compensated preform map by modifying the idealized fiber map by the constraints, wherein the first process-compensated preform map provides the size, shape, orientation, and number of preforms that are required for fabricating the part.

In some embodiments, the invention provides a method for designing a fiber-composite part, wherein the method comprises:

defining a geometry of the part and forces to which the part will be subjected;

determining stress contours of the part based on the geometry and the forces;

generating an idealized fiber map from the stress contours, wherein a direction of fibers in the idealized fiber map aligns with the stress contours of the part; and determining, from the idealized fiber map, a size, shape, orientation, and number of preforms that are required for fabricating the part, consistent with the defined geometry and forces.

In some embodiments, the invention provides a method for designing a fiber-composite part, wherein the method comprises:

generating a process-compensated preform map by applying, to idealized fiber paths within the fiber-composite part that are based on loading conditions, one or more fabrication constraints, wherein the first process-compensated preform map provides the size, shape, orientation, and number of preforms that are required for fabricating the fiber-composite part.

Additional embodiments of the invention comprise any other non-conflicting combination of features recited in the above-disclosed embodiments and in the Detailed Description below.

In the illustrative embodiment, methods in accordance with the present teachings are applied to applicant's own composites manufacturing process. However, this method can be applied to other composites manufacturing processes in which fiber alignment is controllable and important. In light of the present disclosure, those skill in the art will know how to adopt the present teachings to such other composites manufacturing methods.

BRIEF DESCRIPTION OF THE DRAWINGS

FIG. 3 depicts a method for performing step S201 of the method of FIG. 2.

FIG. 4 depicts a method for performing step S202 of the method of FIG. 2.

FIG. 6 depicts a female mold for use in conjunction with practicing the method of FIG. 2.

FIG. 7 depicts a part made from the female mold of FIG. 7.

FIG. 8 depicts the manner in which force is applied to the part of FIG. 7, as the basis for the generating the stress contours in the part.

FIG. 9 depicts ideal fiber vectors for each principle stress direction of the part of FIG. 8, when subjected to specific loading conditions.

FIG. 10 depicts an idealized fiber map based on the ideal fiber vectors of FIG. 9.

FIG. 11A depicts a preform that is consistent with a curved ideal fiber path.

FIG. 11B depicts a preform having a shape that is more practical to fabricate than the preform of FIG. 11A.

FIG. 12 depicts a process-compensated preform map based on the idealized fiber map of FIG. 10, as modified by fabrication constraints.

DETAILED DESCRIPTION

Figure 1:
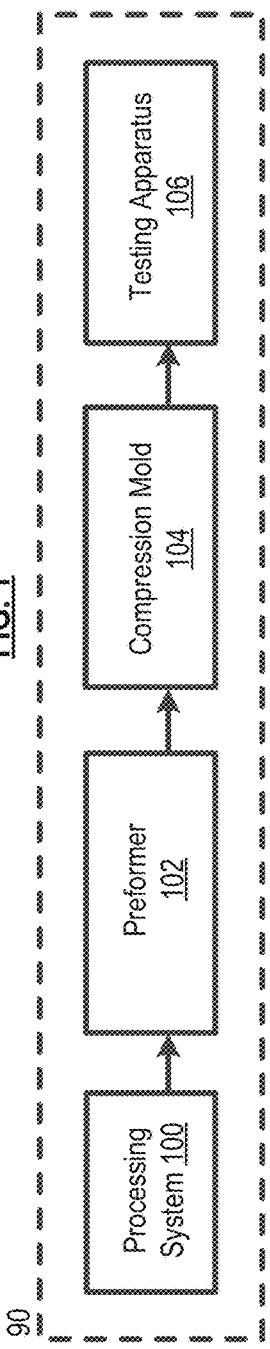
FIG. 1 depicts a system for practicing a method in accordance with the present teachings.

Definitions. The following terms, and their inflected forms, are defined for use in this disclosure and the appended claims as follows:

"Fiber" means an individual strand of material. A fiber has a length that is much greater than its diameter. For use herein, fibers are classified as (i) continuous or (ii) short. Continuous fibers have a length that is about equal to to the length of a major feature of a mold in which they are placed. And, similarly, continuous fibers have a length that is about equal to that of the part in which they will reside. Short fibers have a length that is shorter than the length of a major feature of the mold in which they are placed, and typically comparable to the length of minor features of the mold, plus some additional length to enable "overlap" with other fibers, such as continuous fibers. The term "short fiber," as used herein, is distinct from the "chopped fiber" or "cut fiber," as those terms are typically used in the art. In the context of the present disclosure, short fiber is present in a preform and, as such, will have a defined orientation in the preform, the mold, and the final part. As used generally in the art, chopped or cut fiber has a random orientation in a mold and the final part. Additionally, the length of "short fiber" may be based on the length of the smaller features of a mold (they will be comparable in length). In contrast, the length of chopped or cut fiber typically bears no predefined relationship to the length of any feature of a mold/part.

"Stiffness" means resistance to bending, as measured by Young's modulus.

"Tensile strength" means the maximum stress that a material can withstand while it is being stretched/pulled before "necking" or otherwise failing (in the case of brittle materials).

"Continuous" fiber or fiber bundles means fibers/bundles having a length that is about equal to the length of a major feature of a mold in which the fiber/bundles are placed.

"Tow" means a bundle of fibers, and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" or "Prepreg Tow" means a fiber bundle (i.e., a tow) that is impregnated with resin.

"Preform" means a sized, or sized and shaped portion of tow/tow-preg, wherein the cross section of the fiber bundle has an aspect ratio (width:thickness) of between about 0.25 to about 6. The term preform explicitly excludes sized/shaped (i) tape (which typically has an aspect ratio—cross section, as above—of between about 10 to about 30), (ii) sheets of fiber, and (iii) laminates.

"About" or "Substantially" means+/−20% with respect to a stated figure or nominal value.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Moreover, it is to understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

It will be appreciated by those skilled in art that flow diagrams, such as, without limitation, those depicted in FIGS. 3-6, represent various processes that are substantially represented in computer readable medium and so executed by a processing system, whether or not such processing system is explicitly referenced or shown.

In the claims hereof, any element expressed as a means for performing a specified function is intended to encompass any way of performing that function including, for example, a) a combination of circuit elements which performs that function or b) software in any form, including, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

FIG. 1 depicts system 90 for practicing methods in accordance with the invention. The system includes processing system 100, preformer 102, mold 104, and testing apparatus 106.

Processing system 100 performs at least some portions of the design of a part in accordance with the methods described herein. Specifically, in some embodiments, processing system 100 generates, in any of a number of different formats (e.g., readable by a system that controls preformer 102, readable by a human operator, etc.), a map that ultimately dictates the size and alignment of fibers in a final part. In some embodiments, the method generates the idealized fiber map, without further processing. Situations in which the idealized fiber map is of benefit include, without limitation, those in which a part is intended for small-volume production (such that efficiency is of less concern), or when a manufacturer simply wants to have some sense of part design. In some other embodiments, the map accounts for fabrication issues and provides a design that can be directly implemented to manufacture a part. In such embodiments, the map provides an arrangement of preforms in the part, wherein the map (in some cases with accompanying information), specifies the size, shape, layout, and quantity of each preform that is to be placed in a mold to create the part.

As described in further detail below in conjunction with FIGS. 2 through 15, after a sufficient number of iterations of the present method, as implemented by system 90, information is obtained that can be used to finalize a part design, wherein, in some embodiments, the design provides an arrangement of preforms that results in a part design that: (a) satisfies part requirements, including anticipated load conditions and, (b) results in an increase in manufacturing efficiency of the part.

The output from processing system 100 either specifies, or is used to determine, the shape, size, and number of preforms that will be made by preformer 102. The preforms fabricated by the preformer are placed, either manually or in automated fashion (e.g., pick-and-place robot, etc.), in mold 104, which, in the illustrative embodiment, is used to fabricate a part via compression molding, in known fashion. The fabricated part is tested in testing apparatus 106. Based on the results of the testing, and the number of iterations previously conducted, one or more additional passes through system 90 may be performed. Typically, one or more parameters on which the method operates, or weightings thereof, are altered, thereby resulting in a new map; that is, a different arrangement of preforms.

In some embodiments, the method converges on a part design, which involves a specified tradeoff between part performance and process efficiency. In some other embodiments, iterations of the method provide a plot of part performance as a function of one or more fabrication-efficiency related constraints. A design can be selected using the plot, which can provide, at one extreme, best possible manufacturing efficiency while meeting minimum performance requirements, or, at the other extreme, best part performance while sacrificing manufacturing efficiency. A design anywhere between and including these extremes can be selected as suits a particular application.

Figure 16:
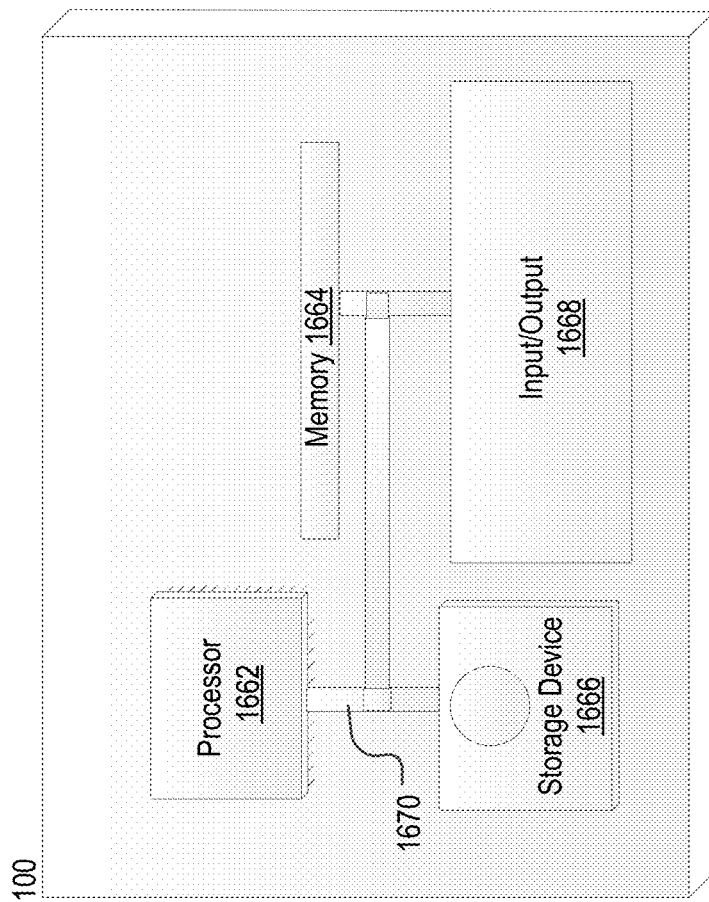
FIG. 16 depicts a processing system for use in carrying out at least a portion of the method of FIGS. 2 and 5, etc.

Referring now to FIG. 16, processing system 100 includes processor 1662, memory 1664, storage device 1666, and input/output structure(s) 1668. One or more busses 1670 typically interconnect components 1662, 1664, 1666, and 1668.

Processing system 100 is suitable for implementing the methods described herein as stored program-control instructions. Processing system 100 may be implemented as a "desk-top" computer, a "lap-top" computer, a "tablet" computer, a smart phone, etc. The processing system may be integrated into another system, such as a system that controls performer 102, testing apparatus 106, etc. The processing system may be implemented via discrete elements or one or more integrated components. Processing system 100 may comprise, for example, a computer running any of a number of operating systems.

Processor 1662 is a general-purpose processor. Processor 1662 executes instructions, such as those that comprise one or more steps of the methods described in one or more of the Drawing figures. Furthermore, processor 1662 is capable of populating, updating, using, and managing data in memory 1664 and/or storage device 1666. In some alternative embodiments of the present invention, processor 1662 is a special-purpose processor. It will be clear to those skilled in the art how to make and use processor 1662.

Memory 1664 stores data and is a computer-readable medium, such as volatile or non-volatile memory. Storage device 1666 provides storage for processing system 100 including, without limitation, instructions for execution by processor 1662, as well as the results of executing such instructions. Storage device 1666 is a non-volatile, non-transitory memory technology (e.g., ROM, EPROM, EEPROM, hard drive(s), flash drive(s), a tape device employing magnetic, optical, or other recording technologies, or other solid-state memory technology, CD-ROM, DVD, etc.). It will be clear to those skilled in the art how to make and use memory 1664 and storage device 1666.

Input/output structure(s) 1668 provide input/output operations for processing system 100, and may include a keyboard, and/or a display, and/or a transceiver or other communications device, for communications via any appropriate medium and via any appropriate protocol. Data and/or information may be received and output using one or more of such input/output devices. In some embodiments, processing system 100, via input/output structure(s) 1668, may receive data from testing apparatus 106 and may deliver data to performer 102.

With continuing reference to FIG. 1, preformer 102 is a device or devices that sizes, or sizes and shapes resin-impregnated fiber bundles (i.e., towpreg), thereby creating "preforms." In some embodiments, preformer 102 comprises a sizing/bending/cutting machine. In such embodiments, the preformer will isolate a desired length towpreg, bend it into a desired shape, and then cut it to separate it from the tow-preg feedstock. Preformer 102 typically comprises a relatively simple arrangement of mechanical elements, which may be implemented in any of a variety of ways, dictated, at least in part, by the shape it's intended to impart to the preform. Typically, although not necessarily, the operations of sizing/bending/cutting are performed by a single device. In some embodiments, preformer 102 comprises a robotic arm that moves the preform to the subsequent processing step. For example, in some embodiments, the robotic arm places the preform in an intermediate holding tray prior to placement in mold 106. In some other embodiments, the robotic arm places the preform in a fixture suitable for creating an arrangement of preforms, referred to herein as a "preform charge." In some additional embodiments, the robotic arm places the preform directly in mold 106. In conjunction with the present disclosure, those skilled in art will be able to make and use preformer 102.

The fiber bundle(s) that is fed to preformer 102 includes thousands of individual fibers, typically in multiples of a thousand (e.g., 1 k, 10 k, 24 k, etc.). Such fiber bundles are typically called "tow." In some embodiments, the fibers in the tow are impregnated with a polymer resin; such material is the "towpreg" previously referenced. Towpreg can have any suitable cross-sectional shape (e.g., circular, oval, trilobal, polygonal, etc.).

The individual fibers in the towpreg can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to ail inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used.

In the illustrative embodiment, the polymer resin is a thermoplastic. Any thermoplastic can be used in conjunction with embodiments of the invention. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC).

Returning to the discussion of FIG. 1, to fabricate a part, the preforms are placed in mold 104 in accordance with a preform map generated by processing system 100, implementing methods described later herein. FIG. 6 depicts female portion 610 of a mold, having mold cavity 612. In preparation for fabricating a part, the preforms are placed in a mold cavity, such as mold cavity 612, in accordance with the arrangement described by the preform map.

In the illustrative embodiment, the part is fabricated via compression molding, well known in the art, wherein the material in the mold is subjected to temperature and pressure to mold a part. The temperature, which is a function of the resin used, is sufficient to liquefy the resin. Under the applied pressure, the fibers (from the preforms) and the now liquefied resin are consolidated. The consolidated material is then cooled to form a fiber-composite part.

In application of the method, a mechanical property of the part is obtained via testing apparatus 106. The mechanical property is typically the amount of force the part can withstand up to the point of failure, as applied in accordance with anticipated loading conditions (magnitude and direction). In some embodiments, testing apparatus 106 is a universal testing machine ("UTS"), well known in the art, such as is available from Instron® of Norwood, Mass. In addition to quantifying the force applied to, and the amount of deflection of, the part at failure, those skilled in the art will be able to use testing apparatus 106 to determine where, and, in some cases, why a part failed. The data obtained from testing apparatus 106, and/or the information resulting from the analysis thereof, is used: (1) as a basis for altering a design parameter (fabrication constraint) or its relative weighting, for a subsequent iteration of the present method, and/or (2) as a basis for determining an "optimum" part design. Description of the embodiments of the invention continue with FIG. 2, which depicts a flow diagram of method 200 in accordance with the present teachings.

Figure 2:
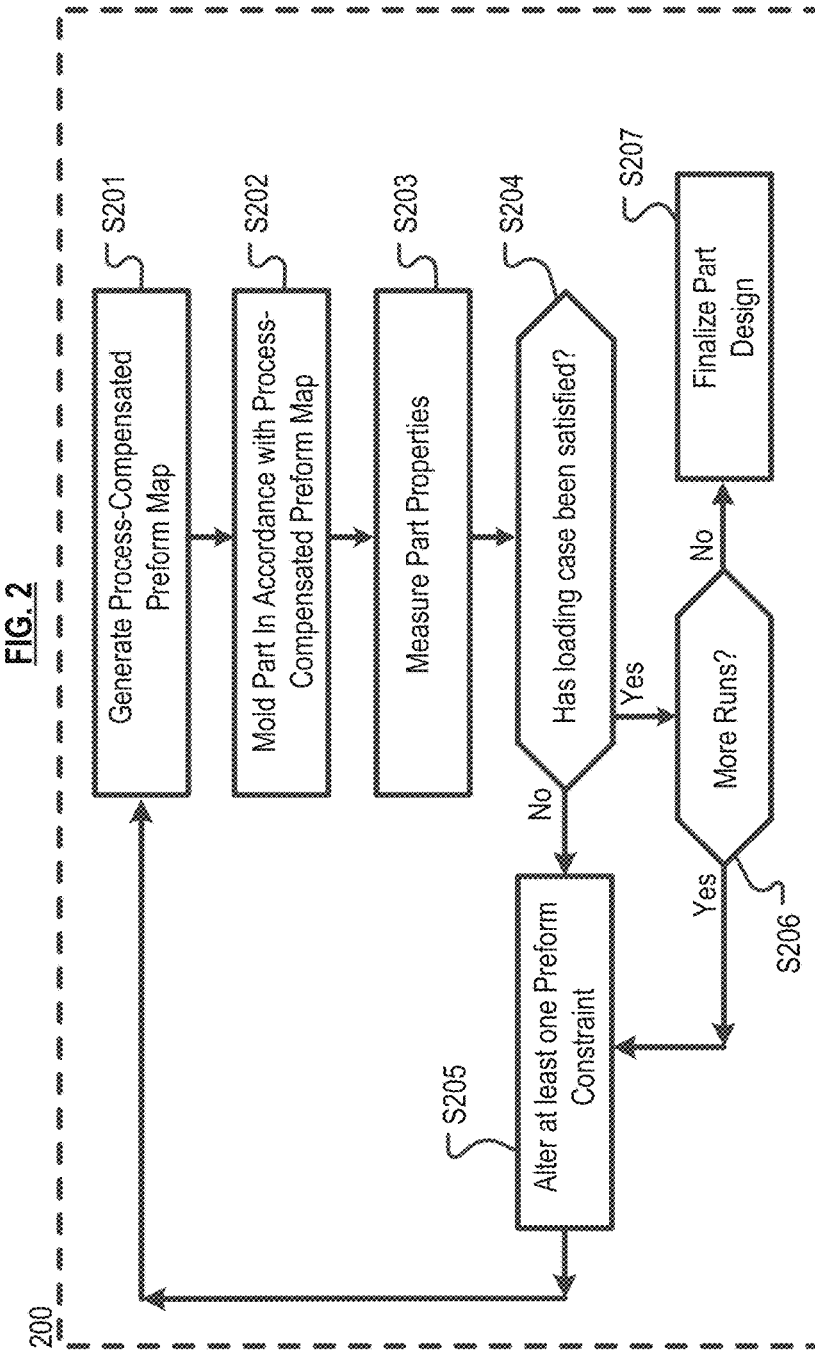
FIG. 2 depicts an embodiment of a method in accordance with present invention.

Method 200 depicted in FIG. 2 can be used to "optimize" the design of a part. It will be appreciated that terms such as "optimize" (and "minimize" or "maximize") as used herein, should not be taken literally; that is, a real-world process is unlikely to "optimize" or "minimize" anything. In the present context, for example, optimization may often involve a tradeoff between the part's mechanical properties on one hand, and manufacturing efficiency on the other, as best suits a particular use case. Relative to a fabrication method in which manufacturing efficiency is not taken into account, embodiments of the invention will increase efficiency (such as by reducing manufacturing time) while producing a part that satisfies mechanical requirements.

The methods disclosed herein provide an ability to design and fabricate a part:
  having superior mechanical properties, at the "cost" of some level of manufacturing efficiency;
  at a relatively high level of manufacturing efficiency while meeting minimum performance requirements;
  or anywhere in between the above two extremes.

In accordance with step S201 of method 200, a process-compensated preform map is created. This "map" (which may or may not be in the actual form of a map) prescribes the size and shape of the preforms that are used to form a part, and the placement orientation of the preforms in the mold. Much or all of step S201 is performed via processing system 100.

FIG. 3 depicts a method for implementing step S201. This method includes step S301, which requires the creation of an idealized fiber map. As described further in conjunction with FIG. 5, the idealized fiber map, which prescribes the layout of fibers in the part, is based solely on the forces to which the part will be subjected, and without regard to any fabrication-related considerations. It thus provides an optimum part design from the perspective of mechanical properties.

In accordance with step S302 of the method for implementing step S201, the idealized fiber map is modified by fabrication-related considerations to create the process-compensated preform map. As described further in conjunction with FIG. 5, such modification takes into account fabrication-related constraints. Some of such constraints pertain to the preforms, and others pertain to the manufacturing process (compression molding in the illustrative embodiment).

The process-compensated preform map will likely deviate to some degree from the idealized fiber map, such that mechanical properties of a part fabricated in accordance with the process-compensated preform map will be at least marginally inferior to those of a part based on the idealized fiber map. Yet, the method will identify designs in which the part will nevertheless satisfy performance requirements. And because the process-compensated preform map accounts for fabrication-related constraints, the part will be fabricated with improved efficiency. That is, fabrication time will be reduced relative to a process that does not consider such constraints.

Referring again to FIG. 2, in step S202, a part is molded in accordance with the process-compensated preform map. In accordance with the illustrative embodiment, the part is molded in accordance with compression-molding protocols. FIG. 4 depicts a method for implementing step S202.

This method includes step S401, which requires fabricating preforms in accordance with the process-compensated preform map. The output from step S201 provides, in addition to the size and shape of each preform and the orientation thereof in the mold, the amount of each type of preform. Consequently, preformer 102 is operated to fabricate preforms in size, shape, and number, as specified by the process-compensated fiber map and any accompanying information.

In accordance with step S402, the preforms are loaded into the mold as specified by the process-compensated preform map. This may be performed manually or robotically. And, in step S403, the part is molded, which, in accordance with the illustrative embodiment, is accomplished via compression molding.

Referring once again to FIG. 2, after the part is fabricated, at least one property of the part is measured in step S203. As previously discussed, this is performed via testing apparatus 106, which may be, for example, a UTS.

At step S204, query whether the loading case for the part has been satisfied. In other words, did the part meet the necessary mechanical requirement(s)? If not, then at step S205, at least one preform-related constraint (described later in this specification) is altered (typically, a relative weighting thereof relative to other constraints is altered), and a new process-compensated preform map is generated based thereon at step S201.

If the loading case for the part has been satisfied, then query at step S206 whether a further iteration of step S201 should be performed based on an altered weighting of a preform constraint to generate another process-compensated preform map. This decision can be based on whether sufficient iterations have been performed to bound the range for acceptable properties of the part being designed.

Specifically, in some embodiments, an independent variable—such as a constraint related to preforms—is varied over a range, such that across the range, a measured property (e.g., force imparted upon part failure, etc.) of a part: (i) exhibits a maxima, and (ii) falls below an acceptable value. Assuming the variation in the independent variable will result in a variation in fabrication efficiency, a part design can then be selected with a desired balance between part performance and fabrication efficiency.

Figure 15:
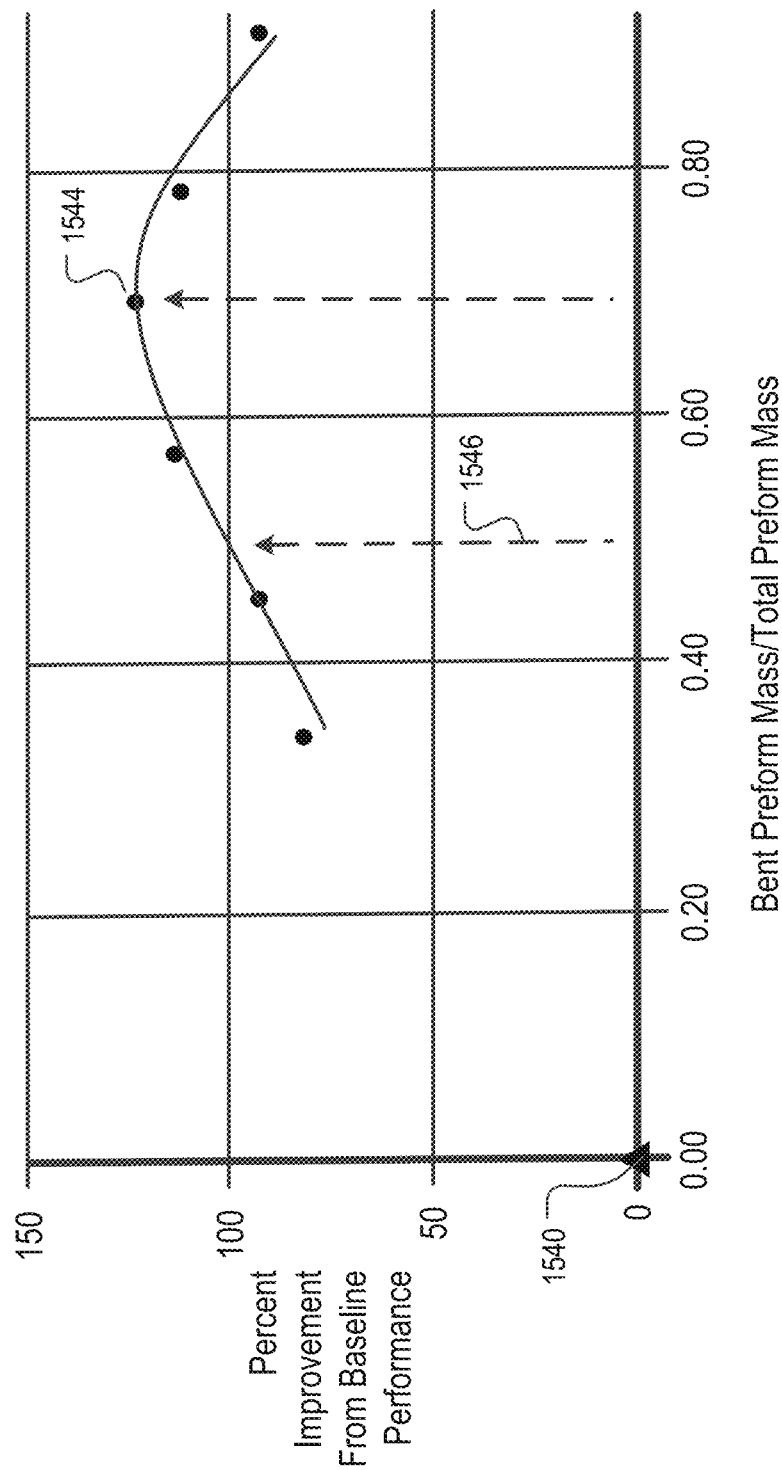
FIG. 15 depicts a plot showing part performance improvement as a function of the ratio of the mass of bent preforms in a part to the total mass of preforms in the part.

For example, it takes longer to create a bent preform than a straight (unbent) preform. Yet, the presence of some amount of bent preforms might, depending on part geometry and loading specifics, result in improved part properties. FIG. 15 depicts a plot that shows performance improvement as a function of the ratio of the mass of bent preforms in a part to the total mass of preforms in the part. In this illustration, the "performance" is the force applied at part failure, which is expressed as the percentage improvement from a baseline performance at point 1540. A maxima in part performance, identified at point 1544, occurs at a bent preform to total preform mass ratio of about 0.7. Assume, for pedagogical purposes, that part performance is considered to be unacceptable at a bent preform to total preform mass ratio that falls below 0.5, as indicated at 1546.

Based on the aforementioned performance and assumption, a design "optimized" for manufacturing efficiency will have a bent preform to total preform mass ratio of about 0.5, since (a) this will include the minimum amount of bent preforms that are required to satisfy the performance requirement, and (b) fabrication time decreases as the number of bent preforms required for a part decreases. Since the ratio is reduced as low as possible while still satisfying the performance requirement, manufacturing efficiency is at a practical maximum. It is notable that part performance also falls to an unacceptable level at a ratio at or above 0.9, but this part of the curve is unlikely to be of interest, since manufacturing efficiency will suffer due to the large amount of bent preforms required.

If an increase in part performance is desired, this can be provided by sacrificing some fabrication efficiency, by increasing the bent preform to total preform mass up to a ratio of about 0.7.

Returning to FIG. 2 and the discussion of step S206, if additional iterations of step S201 are desired, such as to bound the range for acceptable performance as described above, then at least one preform constraint (or its weighting relative to other constraints) is altered, per step S205, and another process-compensated preform map is generated at step S201, and the processing described at steps S202 through S204 is repeated.

If the range of acceptable operation has been bounded, then, at step S207, the preform layout for the design of the part is finalized, such as based on the use of plot similar to that depicted in FIG. 15, as previously discussed. Selection of the final design can be performed manually by reviewing the plot, or in automated fashion based on guidelines input to processing system 100.

Figure 5:
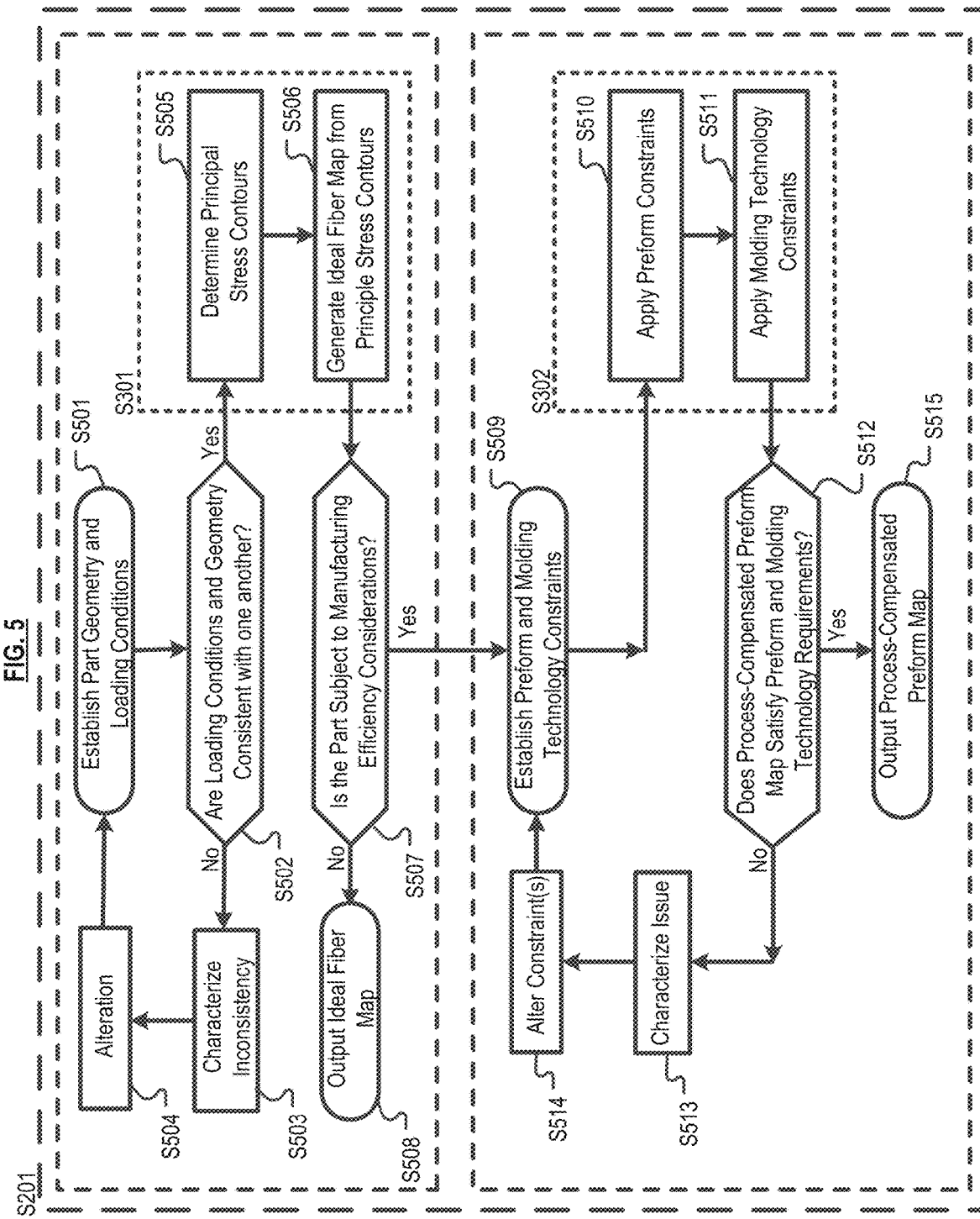
FIG. 5 depicts a further details of a method for performing step S201 of the method of FIG. 2.

FIG. 5 depicts an embodiment of a method for performing step S201; that is, generating the process-compensated preform map. The steps of the method depicted in FIG. 5 fall into one of two groups: A or B, as set off by dashed lines. Group A includes those steps pertaining to generating the idealized fiber map (i.e., steps S501 through S508), and Group B includes those steps pertaining to generating the process-compensated preform map (i.e., steps S509 through S515).

In step S501, part geometry and loading conditions (e.g., the magnitude, direction, and point of application of force to the part) are established and stored in, for example, storage device 1666 of processing system 100. In step S502, the method checks to ensure that the loading conditions and part geometry are consistent with each other. For example, an inconsistency would be if a force was being applied "in space;" that is, at a location that does not correspond to a position of the part. If the loading conditions and part geometry are not consistent, then, at step S503, the inconsistency is identified, and then rectified by appropriately altering the part geometry/loading conditions at step S504.

If the loading conditions and part geometry are consistent with each other, than steps S505 and S506 are performed (in sequence), to generate the idealized fiber map, which is step S301 of the method depicted in FIG. 3.

In step S505, the principle stress contours throughout the part are determined. This determination can be performed, for example, by finite element analysis ("FEA"), based on the part geometry and loading conditions. The result is a "map" of the part that shows the magnitude and direction of the stresses in the part at each "element" of the part, in accordance with FEA processing. Since the ideal fiber path is intended to align with the stress vectors, each such stress vector is considered to be a "fiber vector." In other words, the direction of fiber vector at any given element is considered to be the direction of the stress vector at each such element.

FIG. 9 depicts map 914 of the stress vectors and, hence, fiber vectors for a part, such as part 714 of FIG. 7. The particulars (magnitude and direction) of the stress vectors are a consequence of the manner in which the part is loaded (i.e., where on the part that force is applied). Map 914 is based on the following loading arrangement, as depicted in FIG. 8: apply equal forces F to the ends of two of the arms of part 714, with the part in an "X" orientation. If the part were loaded differently, the stress vectors would necessarily be different, which would ultimately dictate a different fiber layout for the part.

This cross-shaped part includes central region 720 and four arms 716. The region 718 at which adjacent arms intersect has a smoothly curving profile. As depicted in FIG. 9, the fiber vectors 922 are straight within arms 716, but curve between the arms consistent with the profile of region 718 (again, due to the locations at which force is applied). It is notable that typically, the direction of the stress at any such element may vary significantly from the stress direction calculated for a neighboring element. In many cases, this is a just a mathematical artifact. For clarity and simplicity, the stress vectors/fiber vectors depicted in FIG. 9A are shown to have consistent directionality.

In step S506, the ideal fiber vectors are "connected" to one another to form "global" fiber paths (paths that span the part, to the extent possible). The number of paths created depends, among other considerations, on the size the elements used in the FEA analysis. Larger elements will result in fewer fiber paths. The formulation of continuous fiber paths from fiber vectors of individual elements is achieved through traditional optimization methods. Specifically, this transformation can be described as a cost minimization problem. The 'cost' incurred is a function of fiber-path discontinuities, fiber-path deviation from fiber-vector orientation per magnitude (i.e., deviation from a higher magnitude vector incurs higher cost), and the length of fiber paths. By associating a cost with each of these characteristics, the optimization will connect the vectors in the cheapest means possible. In doing so, a map of continuous fibers is derived that is the best possible representation of the fiber vectors in each element. In light of the present teachings, it is within the capabilities of those skilled in the art to implement step S506 via cost minimization or other techniques.

FIG. 10 depicts map 1014 of the global ideal fiber paths. Fibers 1024 nearest the outer edges of arms 716 include a bend having a profile that closely mirrors that of curved region 718. These fibers extend to the ends of adjacent arms. Fibers 1026 located towards the interior of arms 716 are straight, and run to the ends of opposite arms. Center region 720 would include more fiber paths; some have been omitted for the sake of clarity. Note the slight bulge in these fiber paths; this is the result of stress transfer from a thinner region of aligned stress vectors to the wider central region having less homogeneous stress distribution.

After generating the idealized fiber map in step S506, query, at step S507, whether the part being designed is subject to manufacturing efficiency considerations. For example, a part intended for low-volume production might not implicate any efficiency considerations. Or, if the method is being used simply to develop some preliminary information about a design, it might be premature to consider manufacturing issues. If the part is not subject to manufacturing efficiency considerations, then at step S508, the idealized fiber map that was calculated in step S506 is output, stored, etc. Processing can then stop at this point.

If, however, the part is subject to manufacturing efficiency considerations, then processing proceeds to Group B steps for generating a process-compensated preform map.

At step S509, the fabrication constraints that will be applied to modify the idealized fiber map are established and, as appropriate, input into processing system 100. The constraints include those pertaining to use of preforms, as well as those pertaining to the molding method being used, which, in the illustrative embodiment, is compression molding.

Exemplary constraints applicable to preforms include, without limitation:
  Maximize the number of straight sections (or minimize bends), because straight segments are produced faster than bent sections.
  Maximize the number of repeating preform segments, because reducing process variability enables faster production.
  Minimize the number of unique bend radii, because reducing process variability enables faster production.
  Minimize the number of unique tow profiles, because reducing process variability allows for faster production.
  Maximize the length of tow segments (or minimize overlaps), because longer, continuous fibers are stronger than plural, shorter, overlapping fibers.
  Maximize the cross-sectional area of tow profiles, because using larger tows results in fewer total segments being required, and thus fewer process operations. In this regard, for a given section of a part, the number of tows required to fill the volume is the cross-sectional area of the section divided by single tow cross-sectional area,
  Maximize tow-overlap distance where fiber discontinuities are necessary, since fiber paths that cannot be continuously followed will be stronger with a longer overlap distance between the splits in tow segments that comprise the entire fiber path. The greater overlap provides more load-sharing area.
  Minimize deviations between preform fiber paths and ideal fiber paths, since any deviation will lead to some loss of mechanical properties via deviation from the principal stress contours that generated the ideal fiber paths.

Exemplary constraints applicable to compression molding include, without limitation:
  Minimize fiber displacement during compression, because undesired displacement could negatively affect final fiber paths during part fabrication.
  Match the cross-sectional area of the preform with the shape of the mold, since it is easier and faster to place preforms having a shape that match the shape of the mold than those that do not.
  Map segments of fiber that will flow to flow cavities, because some volumes within parts may require flowed fibers (accomplished by overfilling or underfilling certain areas to flow into or away from, respectively).
  Minimize the height of the preform stack, as lesser heights will require less mold mass and thus lead to faster heating and cooling during compression.
  Verify that no non-flowing preforms (preforms that have a length comparable to the length of the part being fabricated) are parallel to compression direction, as such oriented fibers will not maintain fiber orientation under heat and pressure.
  Verify that the final volume of preforms is larger than final part volume, since the method must account for flashing during compression molding.

It is not necessary to employ every constraint in the two categories—only those that are crucial to the fabrication of the particular component. In fact, any one or more of the constraints listed above (preform related or compression-molding related) can form the basis for the analysis. For a part that will be very simple to make via compression molding, for example, constraint(s) need only pertain to the preforming category, or vice versa.

The prioritization of the constraints be selected as well. Whether applied to the idealized preform map in parallel or sequentially, the weight of each constraint is determined by user input. By apply higher-priority constraints earlier sequence or giving them greater weight, they will have a larger effect on the alterations to the ideal preform map. Iteratively running this method enables assessment of the sensitivity of prioritization, ultimately generating the most practical map.

The weighting applied to each constraint can be individually varied to alter the process-compensated preform map. For example, rather than equally weighting the constraints pertaining to maximizing straight segments and minimizing ideal fiber-path variations, a greater weight could be applied to maximizing straight preform segments. In comparison to a design having equal weighting for these constraints, a design that places relatively greater weight on maximizing straight preform segments will result in a design that is likely to exhibit somewhat compromised properties (based on a likely deviation from the ideal fiber paths) but improved manufacturing efficiency. In this regard, consider the following.

As previously discussed, FIG. 7 depicts cross-shaped part 714, which includes central region 720 and four arms 716. The region 718 at which adjacent arms intersect has a smoothly curving profile. Part 714 is formed by filling mold cavity 612 of female mold 610 (FIG. 6) with preforms. The present teachings are applied to develop a preform layout for filling cavity 612. FIG. 10 is assumed to provide the idealized global fiber paths for this part.

Figure 13B:
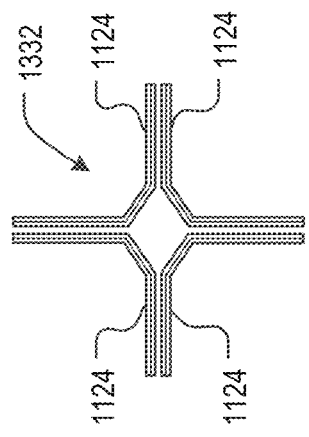
FIG. 13B depicts the use of four bent preforms to create a "cross" structure for use in a mold.
Figure 13A:
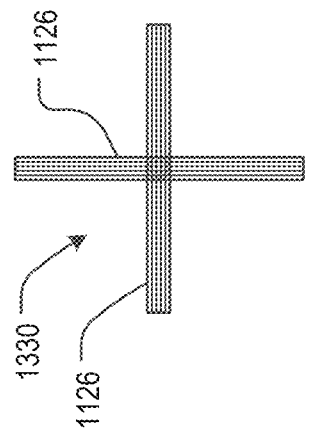
FIG. 13A depicts the use of two straight preforms to create a "cross" structure for use in a mold.

FIG. 13A depicts a "cross"-shaped arrangement 1330 that is formed using two straight preforms 1126. FIG. 13B also depicts a "cross"-shaped arrangement; however cross-shaped arrangement 1332 of FIG. 13B is formed using four bent preforms 1124. FIG. 14A depicts a plurality of arrangements 1330, which will be used to fill mold cavity 612 (offset for clarity). This design would the result from the use of the present method when, for example, full weight is applied to the constraint that maximizes straight preforms, and minimal weight is applied to the constraint of minimizing ideal fiber-path deviation. In this regard, note how the region between adjacent arms in arrangements 1330 does not have a smoothly curving profile; rather, the arms intersect one another at ninety degrees. While this design results in a part that can made efficiently (quickly) as a consequence of the exclusive use of straight preforms, its properties are expected to suffer to some degree due to the deviation from the idealized fiber alignment.

Figure 14B:
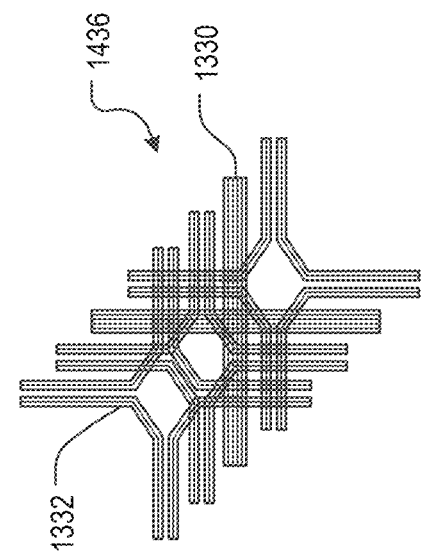
FIG. 14B depicts the portion of a process-compensated preform map shown in FIG. 14A, but in a case in which the fabrication constraints involve a weighting between minimizing the deviation from an ideal path and maximizing the use of straight preforms.
Figure 14A:
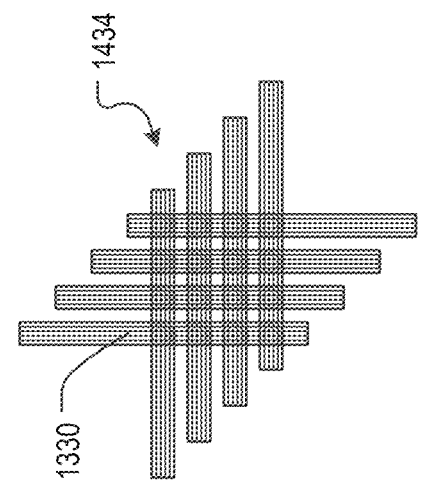
FIG. 14A depicts a portion of a process-compensated preform map wherein a constraint requires maximizing the use of straight preforms.

FIG. 14B depicts a plurality of arrangements 1332 and one arrangement 1330. This design results from a weighting that more heavily weights the constraint of minimizing the deviation from the idealized fiber alignment than the use of straight preforms. In this regard, note how the region between arms 1124, while not a smooth curve as in the ideal fiber path, nevertheless deviates to a far lesser degree than that region of arrangement 1330. A part based on this preform layup would take longer to fabricate (reduced efficiency) than one based on the preform layup of FIG. 14A due to the time it would take to fabricate the bent preforms. However, due to the reduced deviation of fibers in arrangement 1332 from the ideal fiber alignment, the properties of the part are expected to be superior to those based on the preform layup depicted in FIG. 14A.

Continuing with the discussion of the method of FIG. 5, at steps S510 and S511, the process-compensated preform map is generated by applying the two groups of constraints to the idealized preform map. This is step S302 of the method of FIG. 3. Like step S506, this step can also be implemented as a cost-minimization problem. The 'cost' incurred is a function of the various constraints and their respective weightings. In light of the present teachings, it is within the capabilities of those skilled in the art to implement steps S510 and S511 via cost minimization or other techniques.

The application of such constraints can seen, for example, by comparing FIG. 11A, which depicts idealized fiber path 1024 having a smooth curve/bend, to FIG. 11B, which depicts preform 1124, which replaces a smooth curve with a straight line and two bends, while incurring relatively little deviation from the idealized form. That substitution might arise from a constraint pertaining to the size of the bend radii that can be formed by the performer, etc.

FIG. 12 depicts process-compensated preform map 1214, which includes bent preforms 1124, straight continuous preforms 1126, and straight, short preforms 1128. As previously discussed, the inclusion of bent preforms 1124 results from applying a non-zero weighting to the constraints pertaining to minimizing the deviation between preform paths and ideal fiber paths and maximizing the use of straight segments.

Based on FEA simulation specifics and part geometry, each "element" of the simulated part will have a corresponding size, such that the length and width of the various global ideal fiber paths can be determined. As a function of the towpreg feed being used to create preforms, the preform cross-sectional area is known. Thus, having knowledge of the size of ideal fiber paths and the size of the preforms, the ideal fiber paths can be converted to the equivalent in terms of preforms; that is, a map that provides the length, shape, location/orientation of preforms and the requisite number thereof.

At step S512, query whether the process-compensated preform map satisfies preform and molding technology requirements. For example, it is important to ensure that the preforms being used in the map can actually be manufactured (such as a might be an issue if a preform in the map included an excessive number of bends). If not, then the issue is characterized at step S513, which can be characterized automatically (i.e., by processing system 100 or by a user. Having characterized the issue, an appropriate constraint (or weighting) is altered at step S514 with the expectation that a new process-compensated preform map will be generated that satisfies all requirements. And once such a map is generated, it is output (e.g., printed, displayed, etc.) or stored at step S515.

It is to be understood that the disclosure describes a few embodiments and that many variations of the invention can easily be devised by those skilled in the art after reading this disclosure and that the scope of the present invention is to be determined by the following claims.

What is claimed:

1. A method for designing a fiber-composite part to be formed, the method comprising:
    defining a geometry of the part and forces to which the part will be subjected;
    determining stress contours of the part based on the geometry and the forces;
    generating an idealized fiber map from the stress contours, wherein a direction of fibers in the idealized fiber map aligns with the stress contours of the part;
    defining a plurality of constraints applicable to fabrication of the part, wherein the constraints relate to preforms that are required for fabricating the part; and
    generating a first process-compensated preform map by modifying the idealized fiber map by the constraints, wherein the first process-compensated preform map provides the size, shape, orientation, and number of preforms that are required for fabricating the part.

2. The method of claim 1 further comprising placing preforms, having the size and shape of the preforms in first process-compensated preform map, in a mold, wherein the preforms are placed in the mold in accordance with the orientation specified in the first process-compensated preform map.

3. The method of claim 2 further comprising molding the part, by applying heat and pressure to the preforms in the mold, in accordance with compression molding protocols.

4. The method of claim 3 further comprising testing the part to determine at least one performance measure of the part.

5. The method of claim 1 wherein defining constraints further comprises applying a weighting to at least some of the constraints, wherein the weighting affects at least one of the size, shape, and orientation of the preforms appearing in the first process-compensated preform map.

6. The method of claim 5 wherein after generating the first process-compensated preform map, the method further comprises:
    altering the weighting of at least one constraint of the plurality of constraints; and
    generating a second process-compensated preform map, wherein at least one of the size, shape, orientation, and number of preforms therein is different than for the preforms in the first process-compensated preform map as a consequence of the altered weighting.

7. The method of claim 4, and further comprising varying at least one constraint of the plurality of constraints over a range, wherein for each variation in the constraint, a part is fabricated based on a generated process-compensated preform map, and the part is tested to obtain a performance measure, wherein, the constraint is sufficiently varied so that the range encompasses:
(i) a first value of the constraint at which the part exhibits a maxima in the performance measure; and
(ii) a second value of the constraint at which the performance measure of the part falls below an acceptable value.

8. The method of claim 7, and further comprising selecting, as a design for the composite part, the process-compensated preform map corresponding to a value of the constraint falling within the range defined between and including the first value and the second value.

9. The method of claim 7, and further comprising selecting, as a design for the composite part, the process-compensated preform map corresponding to the first value of the constraint, thereby providing a design for best part performance.

10. The method of claim 7, and further comprising selecting, as a design for the composite part, the process-compensated preform map corresponding to the second value of the constraint, thereby providing a design for optimized fabrication efficiency.

11. A method for designing a fiber-composite part, the method comprising:
defining a geometry of the part and forces to which the part will be subjected;
determining stress contours of the part based on the geometry and the forces;
generating an idealized fiber map from the stress contours, wherein a direction of fibers in the idealized fiber map aligns with the stress contours of the part; and
determining, from the idealized fiber map, a size, shape, orientation, and number of preforms that are required for fabricating the part, consistent with the defined geometry and forces.

12. The method of claim 11, and further comprising placing preforms, having the determined size and shape, in a mold, wherein the preforms are placed in the mold in accordance with the determined orientation.

13. The method of claim 12, and further comprising molding the part, by applying heat and pressure to the preforms in the mold, in accordance with compression molding protocols.

14. The method of claim 13, and further comprising testing the part to determine at least one performance measure of the part.

15. A method for designing a fiber-composite part, the method comprising generating a process-compensated preform map by applying, to idealized fiber paths within the fiber-composite part that are based on loading conditions, one or more fabrication constraints, wherein the first process-compensated preform map provides the size, shape, orientation, and number of preforms that are required for fabricating the fiber-composite part.

16. The method of claim 15, and further comprising fabricating the part using the preforms and orientation specified by the first process-compensated preform map.

17. The method of claim 16, and further comprising testing the part to determine at least one performance measure of the part.

18. The method of claim 15, and further wherein a weighting is applied to at least one of the fabrication constraints, wherein the weighting affects at least one of the size, shape, and orientation of the preforms appearing in the first process-compensated preform map.

19. The method of claim 18, wherein after generating the first process-compensated preform map, the method further comprises:
altering the weighting applied to the at least one fabrication constraint; and
generating a second process-compensated preform map based on the altered weighting, wherein at least one of the size, shape, orientation, and number of preforms therein is different than for the preforms in the first process-compensated preform map.

* * * * *